United States Patent
Hayakawa et al.

(12) 
(10) Patent No.: US 6,384,363 B1
(45) Date of Patent: May 7, 2002

(54) PROCESS FOR ELECTRIC DISCHARGE MACHINING AND APPARATUS THEREFOR

(76) Inventors: Hideo Hayakawa, 2656-12, Moriya-ko, Moriya-machi, Kita-soma-gun, Ibaraki-ken, 302-0128; Kyoko Suzuki, 4-14-16, Tajima, Urawa-shi, Saitama-ken, 336-0037; Kenichi Karasawa, 3-1-19-702, Hiratsuka, Shinagawa-ku, Tokyo 142-0051, all of (JP)

( * ) Notice: Subject to any disclaimer, the term of this patent is extended or adjusted under 35 U.S.C. 154(b) by 0 days.

(21) Appl. No.: 09/302,349

(22) Filed: Apr. 30, 1999

(30) Foreign Application Priority Data

May 15, 1998 (JP) ............................................ 10-133222

(51) Int. Cl.⁷ ................................................ B23H 1/10
(52) U.S. Cl. .................................. 219/69.14; 219/69.17
(58) Field of Search ........................... 219/69.14, 69.17, 219/69.11, 69.13

(56) References Cited

U.S. PATENT DOCUMENTS 5,349,149 A  *  9/1994  Shiraki et al. ............ 219/69.14
5,435,894 A       7/1995  Hayakawa

FOREIGN PATENT DOCUMENTS

| JP | 59-152028 | * 8/1984 | ............. 219/69.14 |
| JP | 3-234412  | * 10/1991 | |
| JP | 5-75524   | 10/1993 | |
| WO | WO 91/04820 | 4/1991 | |

* cited by examiner

Primary Examiner—Geoffrey S. Evans
(74) Attorney, Agent, or Firm—Rader, Fishman & Grauer, PLLC

(57) ABSTRACT

There are described a process for electric discharge machining of a work, which uses deionized water containing no rust preventing agent, as working liquid, and an apparatus therefor. The electric discharge machining apparatus additionally has a high-frequency AC applying device, a grounding electrode and a pair of applying electrodes in which are immersed in the deionized water to alternatively apply high-frequency AC voltage to the applying electrodes for decreasing oxidation-reduction potential of the deionized water.

7 Claims, 2 Drawing Sheets

PROCESS FOR ELECTRIC DISCHARGE MACHINING AND APPARATUS THEREFOR

BACKGROUND OF THE INVENTION

1. Field of the Invention

The present invention relates to a process for electric discharge machining and more particularly, a process for carrying out the electric discharge machining by using a deionized water as working liquid, which contains no rust preventing agent, and an apparatus for carrying out the process.

2. Related Arts

In recent years, a deionized water has been used as working liquid for an electric discharge machining, in lieu of an insulating oil. However, the deionized water has no rust preventing ability for a work to be treated and thus an alkanol amine such as triethanolamine, a fatty amide such as amide oleate or the like has been added to the deionized water to prepare the working liquid (WO 91/04820 and Japanese Patent 5-75524(B)).

A waste liquid containing such a rust preventing agent falls within one of industrial wastes and thus it must entrusted a vendor for its disposal, which increase a working cost of the electric discharge machining and is not preferable from a view point of environmental pollution.

SUMMARY OF THE INVENTION

An object of the invention, therefore, is to provide a process for electric discharge machining by using as working liquid a deionized water which contains no rust preventing agent, while preventing generation of rust to a work and an apparatus for carrying out the process.

One of the present inventors has proposed a process and apparatus for improving quality of water by arranging a pair of applying electrodes and a grounding electrode in water to be treated, and applying high-frequency AC voltage to the applying electrodes to decrease oxidation-reduction potential (ORP) of the water and decompose organic and other materials therein (U.S. Pat. No. 5,435,894).

The inventors have applied such a known high-frequency AC applying process to an electric discharge machining to unexpectedly find that generation of rust can be prevented, even if a rust preventing agent shall not be added to a deionized water as working liquid and that although thin rust layer of ferric oxide is formed on surface of a work, but a hard magnetite-like layer is formed under the ferric oxide layer which can be removed by a simple acid dipping operation, whereby the invention has been established.

Therefore, the process for electric discharge machining according to the invention, which comprises a step of arranging a grounding electrode and a pair of applying electrodes in a deionized water, applying high-frequency AC voltage to the applying electrode to decrease oxidation-reduction potential of the deionized water for making it into working liquid, and then carrying out the electric discharge machining operation of a work.

When the process according to the invention is carried out, it is preferable to use the deionized water with ORP of not higher than 200 mV, since the rust preventing effect to the work shall decrease, if ORP of the deionized water is higher.

It is preferable to make the work in a working tank in an electrical grounding state. Although this utilizes a principle of cathodic protection known in the field of DC, but it seems to be effective also in the process for electric discharge machining. The grounding should be made through a resistor of 300–500Ω to prevent transmission of discharge working current to the work.

While, the electric discharge machining apparatus according to the invention, which additionally comprises a high-frequency AC voltage applying device comprising a grounding electrode, a pair of applying electrodes, a DC voltage source, a first and second high-frequency switches connected to the DC voltage source through a variable resistor, respectively, a high-frequency switching commander circuit of a flip-flop circuit connected to the first and second high-frequency switches through a resistor respectively, and a high-frequency oscillation circuit, to apply high-frequency AC voltage to the applying electrodes and decrease oxidation-reduction potential of deionized water as working liquid for a work.

In the electric discharge machining apparatus according to the invention, the grounding electrode and applying electrodes of the high-frequency AC voltage applying device may be arranged in a working tank. Of course, it is possible to prepare the deionized water by treating city water, well water or the like with an ion-exchange resin and transferring the deionized water to the working tank through a storage tank. In such a case, the applying electrodes are arranged in the storage tank and the grounding electrode is arranged in the working tank.

In the high-frequency AC voltage applying device for the electric discharge machining apparatus according to the invention, the voltage of voltage source is 100V, but its effective value is a half or more less and the current value is 500 mA–1 A to ensure operational safety. The frequency of signal given from the high-frequency oscillation circuit to the high-frequency switching commander circuit is in a range of 20–50 KHz. The grounding electrode and each of the applying electrodes were made of steel or stainless-steel plate and titanium plate having adventure finished surface and plated with platinum, respectively.

DETAILED DESCRIPTION OF PREFERRED EMBODIMENT

A process and apparatus for electric discharge machining according to the invention will now be explained in more detail with reference to the drawings and then with a Test Examples.

Figure 1:
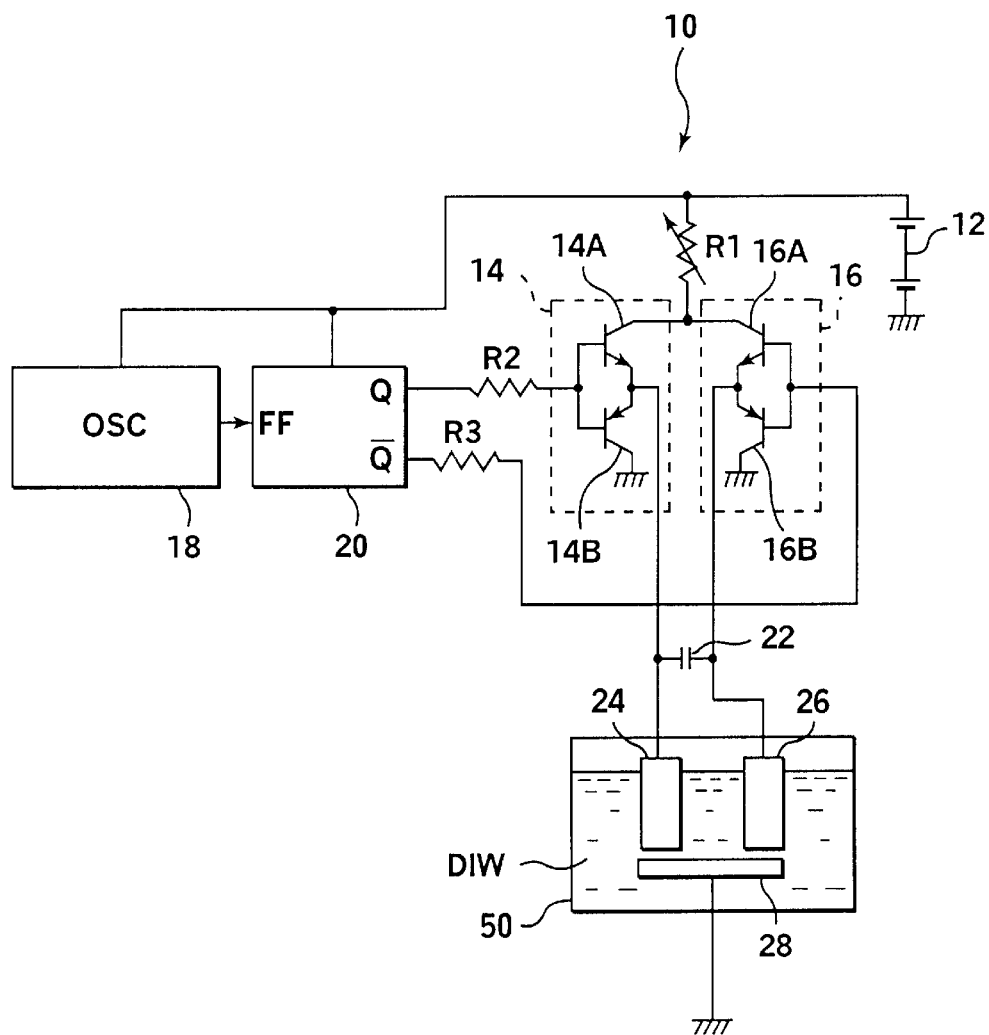
FIG. 1 is a circuit diagram for an embodiment of high-frequency AC voltage applying device for treating a deionized water to prepare working liquid for an electric discharge machining process according to the invention by decreasing oxidation-reduction potential of the deionized water.
Figure 2:
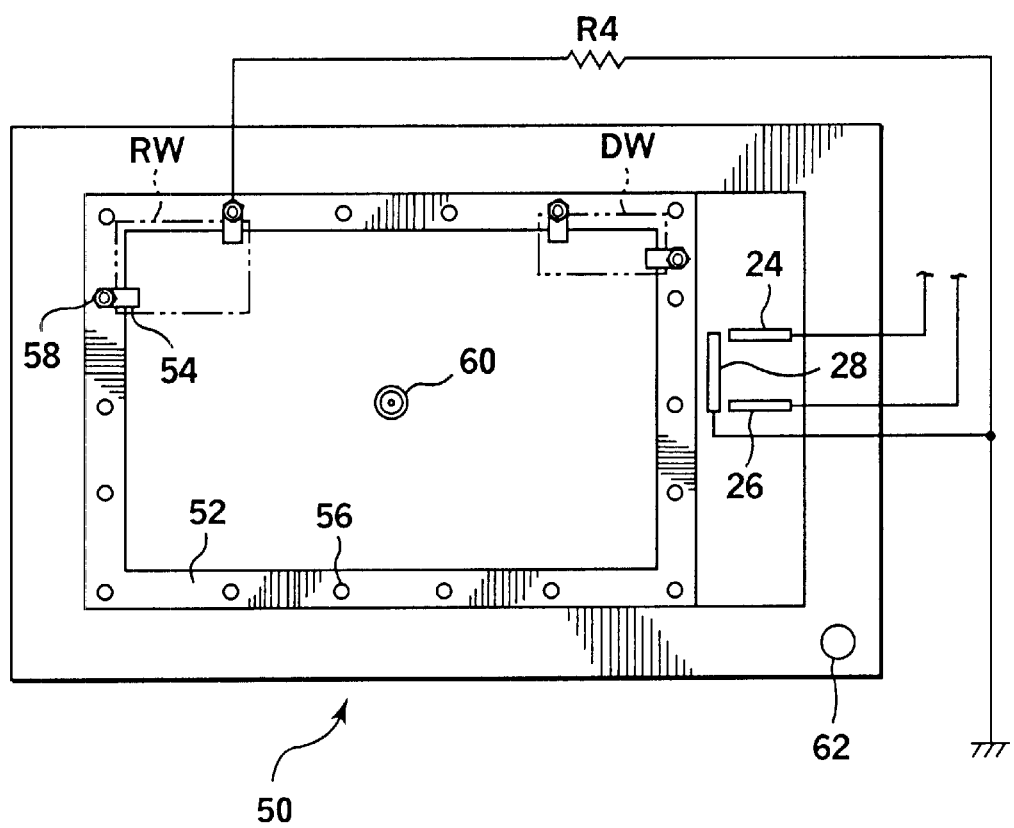
FIG. 2 is a plan view roughly showing a working tank of an electric discharge machining apparatus and one of arranging relations of a grounding electrode and applying electrodes for the high-frequency AC voltage applying device as shown in FIG. 1, works clamped to a fixing frame and a wire guide.

FIG. 1 shows a circuit diagram for a high-frequency AC voltage applying device to be used by a electric discharge machining process according to the invention, and a relation of a grounding electrode and applying electrodes of the device as well as a working tank of electric discharge machining apparatus. FIG. 2 is an inner part of the working tank of electric discharge machining apparatus to show one of manners for arranging the grounding and applying electrodes in the working tank. Please note that the electric discharge machining apparatus per se may be a conventional type one and the characteristic of the apparatus according to the invention lies in additionally providing the high-frequency AC voltage applying device and thus, the working tank of the apparatus is only illustrated.

The high-frequency AC voltage applying device 10 shown in FIG. 1 comprises a DC voltage source 12, a first and second high-frequency switches 14 and 16 connected to the voltage source through a variable resistor R1, a high-frequency oscillation circuit 18, a high-frequency switching commander circuit 20 constructed as a flip-flop circuit connected to the first high-frequency switch 14 through a resistor R2 and connected to the second high-frequency switch 16 through a resistor R3, a capacitor 22 connected in parallel at output sides of the first and second high-frequency switches 14 and 16, a first applying electrode 24 connected to the first high-frequency switch 14, a second applying electrode 26 connected to the second high-frequency switch 16, and a grounding electrode 28.

The voltage of DC voltage source is 100V, but its effective value as the high-frequency AC voltage applying device 10 is less than 50V and the current value is 500 mA–1 A, but usually about 200 mV to ensure operation safety of the device. Each of the first and second high-frequency switches 14 and 16 has two transistors 14A, 14B and 16A, 16B, respectively. In this embodiment, the applying electrodes 24, 26 and grounding electrode 28 are arranged in a working tank 50 of electric discharge machining apparatus (not shown), in which tank, deionized water DIW is accommodated. The deionized water can be prepared by treating city water, well water or the like by ion-exchange resin, until its resistivity becomes about 70,000 Ωcm. The grounding electrode is a steel plate and each of the applying electrodes titanium plate having aventurine finished surface and plated with platinum.

Preparatory operations prior to actual electric discharge machining process according to the invention will now be explained with reference to FIG. 2. In the first place, a work (real) RW and if necessary, a dummy work DW are fixed to a fixing frame 52 arranged in the working tank 50. The fixing operation of the work and dummy work is carried out by inserting a bolt 58 to a screwed hole formed in the fixing frame 52 through an opening (not shown) in a clamp 54, and catching an end of the work or dummy work with the clamp, and then clamping same with said bolt. The work RW can be grounded through a resistor R4 having a value of 300–500Ω to prevent working current thereto, when the work is subjected to its electric discharge machining. A wire guide and drain port for discharging the working liquid are shown by reference numerals 60 and 62, respectively.

In the second place, the deionized water DIW (see FIG. 1) is charged into the working tank 50 and the high-frequency AC voltage applying device 10 shown in FIG. 1 is set-up to give output from the DC voltage source 12 to the first and second high-frequency switches 14 and 16. In this case, the output from the DC voltage source is also given to the high-frequency oscillation circuit 18 and the high-frequency switching commander circuit 20, whereby the first and second high-frequency switches 14 and 16 are controlled and turned ON-OFF with a high periodicity to form high-frequency AC voltage, output of which is fed to the pair of applying electrodes 24 and 26 arranged in the working tank 50 to start treatment of the deionized water DIW in the working tank 50.

The deionized water DIW in the working tank becomes working liquid usable for the electric discharge machining process according to the invention, if oxidation-reduction potential of the treated deionized water showed a value not higher than 200 mV and thus the electric discharge machining operation shall be started in a conventional manner, but maintaining the high-frequency AC voltage applying device 10 in working state. The setting of oxidation-reduction potential of the deionized water is carried out by operating the variable resistor R1 to mainly adjust height of voltage wave form and selecting the capacitor 22 with a suitable capacitance to additionally adjust the height, since current intermittently flows between the applying electrodes 24, 26 and grounding electrode 28, although its value is quite low. A slight fluctuation can only be recognized in oxidation-reduction potential of the working liquid during electric discharge machining operation of the work.

Test Examples 1 and 2

A castle wall like cutting operation was carried out by using a high-frequency AC voltage applying device as shown in FIG. 1, utilizing a wire-type electric adischarge machining apparatus ("DIAX (Trademark)", Model FX10 manufactured by Mitsubishi Electric Co., Ltd. of Japan), and arranging the grounding electrode and both applying electrodes in a working liquid tank of working liquid supplying tank, and selecting as a work and dummy work a rotary ground rough block of carbon steel (S50C), to visually observe with time intervals the surface of the work and dummy work and take photographs by using a digital camera. As shown in FIG. 2, the work and dummy work are clamped to a fixing frame arranged in a working tank at one of corners and another corner, respectively.

(a) Following Table 1 shows results, when the electric discharge machining operation was carried out by using deionized water (resistivity: about 70,000Ω)cm as working liquid, oxidation-reduction potential thereof being lowered to about 100 mV.

TABLE 1

| Time lapsed | Surface of work | Surface of dummy work |
|---|---|---|
| 20 hours | Somewhat discolored | Same as left |
| 50 hours | Whole discolored to | Discolored into pinky yellow |
| After acid dipping | Discoloration disappears and its color returned | Same as left |

(b) Following Table 2 shows results, when the electric discharge machining operation was carried out by using deionized water (resistivity: about 70,000 Ωcm) as working liquid, oxidation-reduction potential thereof being lowered to a range of 150–180 mV.

TABLE 2

| Time lapsed | Surface of work | Surface of dummy work |
|---|---|---|
| 20 hours | Wholly discolored | Somewhat discolored |
| 40 hours | Wholly discolored into purple | Discoloration increases in its extent |
| 60 hours | Wholly discolored into reddish brown | Discoloration further increases in its extent |
| After acid dipping | Discoloration disappears and its color turned to own one | Same as left |

From results shown in Table 1 and 2, it is apparent that the discoloration due to generation of reddish rust on the work and dummy work also occurs in case of carrying out the electric discharge machining process according to the invention, but the rust is not progressive one and thus can be removed by a simple acid dipping operation. The ground of that the rust is not progressive one and can be removed by the acid dipping operation lies in that a magnetite-like hard layer is formed under the reddish rust layer and in surface layer of the worked surface, which phenomenon is inherent to the process according to the invention and can be said as very specific one.

Since the rotary rough ground steel block was selected for the work in the above tests, the acid dipping step was required, but if a finishing ground work is selected, powdery working dust does not adhere on the work and thus the acid dipping operation can be omitted.

According to the electric discharge machining process of the invention, working sludge favorably peels off from the work during the machining operation, a dipping rust can not be recognized on working surface of the work, powdery working rust does not adhere to the working tank and is caught by a filter to prevent a formation of a hard scale on the inside of piping for the working liquid, and the working liquid includes no rust preventing agent and thus the waste working liquid does not constitute an industrial waste. Further, even if the original water for preparing the deionized water is city or well water containing organic materials and the like, such water can also be used, since it is converted by an ion-exchange resin into the deionized water and then oxidation-reduction potential of the deionized water is decreased by the high-frequency AC voltage applying device, through which organic materials shall be decomposed, so that the working liquid to be used for the process according to the invention does not cause putrefaction to make possible a continuous use for a long period of time.

Comparative Test Example

An electric discharge machining process was carried out under conditions similar to those given in above Test Examples, with the exception of that the high-frequency AC voltage applying device was not actuated, which means the deionized water not decreased in its oxidation-reduction potential was selected as working liquid. Results are shown in following Table 3.

TABLE 3

| Time lapsed | Surface of work | Surface of dummy work |
| --- | --- | --- |
| 25 hours | Generation of reddish brown discoloration | Materials are adhered in large amount. Rust generates |
| 50 hours | Change into blackish rust | Adhered materials increases in amount and rust progresses |
| 100 hours | blackish rust becomes clearly notified | Adhered materials increases in more amount and rust progresses |
| Working stopped Left to stand for 48 hours | Block rust changes into reddish rust and its extent is fairly great | Rust further progresses |

Consideration

Between the results shown in Tables 1 and 2 on electric discharge machining tests according to the invention and the results shown in Table 3 on comparative electric discharge machining test, it is hard to evaluate in a strict meaning, since continuous working period of time in each case is different. According to the process of the invention, however, the work and dummy work show similar behaviors in details on discoloration and almost no material is adhered thereon, but according to the control process, the materials are adhered on the dummy work and accumulates in a large amount. In particularly, the rust formed on surface of the work during the working treatment by the process according to the invention is not progressive one. It means that no inconvenience does occur, even if the treated work is left to stand in the working tank, as it is, which is basically different from the case shown in Comparative Test Example.

Therefore, it is estimated that the deionized water decreased in its oxidation-reduction potential not only prevents generation of progressive rust, but also improves working environment in the working tank.

What is claimed is:

1. An electric discharge machining process comprising the steps of:

arranging a grounding electrode and a pair of applying electrodes in deionized water;

applying a high-frequency AC voltage to the applying electrodes to decrease an oxidation-reduction potential of the deionized water for making the deionized water into a working liquid; and then carrying out the electric discharge machining operation of a work.

2. An electric discharge machining process as claimed in claim 1, wherein said deionized water made as the working liquid shows oxidation-reduction potential not higher than 200 mV.

3. An electric discharge machining process comprising the steps of:

arranging a grounding electrode and a pair of applying electrodes in deionized water;

applying a high-frequency AC voltage to the applying electrodes to decrease an oxidation-reduction potential of the deionized water for making the deionized water into a working liquid; and then carrying out the electric discharge machining operation of a work;

wherein said work is grounded through a resistor.

4. An electric discharge machining apparatus, comprising: a high-frequency AC voltage applying device and a fixing frame for clamping a work;

wherein said AC voltage applying device comprises:

a grounding electrode, a pair of applying electrodes, a DC voltage source, first and second high-frequency switches connected to the DC voltage source through a variable resistor, respectively, a high-frequency switching commander circuit of a flip-flop circuit connected to the first and second high-frequency switches through resistors respectively, and a high-frequency oscillation circuit, to apply a high/frequency AC voltage to the applying electrodes and decrease oxidation-reduction potential of deionized water for making the deionized water a working liquid for said work.

5. An electric discharge machining apparatus as claimed in claim 4, wherein said grounding electrode and applying electrodes are arranged in a working tank.

6. An electric discharge machining apparatus as claimed in claim 4, wherein said grounding electrode and applying electrodes are arranged in a storage tank for working liquid.

7. An electric discharge machining apparatus having a high-frequency AC voltage applying device, said AC voltage applying device comprising:

a grounding electrode, a pair of applying electrodes, a DC voltage source, first and second high-frequency switches connected to the DC voltage source through a variable resistor, respectively, a high-frequency switching commander circuit of a flip-flop circuit connected to the first and second high-frequency switches through resistors respectively, and high-frequency oscillation circuit, to apply a high-frequency AC voltage to the applying electrodes and decrease oxidation-reduction potential of deionized water for making the deionized water a working liquid for a work;

wherein said grounding electrode and applying electrodes are arranged in a working tank; and wherein a work to be clamped by a fixing frame arranged in said working tank is grounded through a resistor.

* * * * *